Patented Nov. 7, 1939

2,178,694

UNITED STATES PATENT OFFICE 2,178,694

METHOD OF PURIFYING CAUSTIC SODA

Irving E. Muskat, Akron, and William F. Waldeck, Wadsworth, Ohio, assignors to The Pittsburgh Plate Glass Company, Allegheny County, Pa., a corporation of Pennsylvania No Drawing. Application October 28, 1937, Serial No. 171,517

9 Claims. (Cl. 23—184)

This invention relates to the purification of sodium hydroxide, especially with relation to its purification by crystallization of sodium hydroxide monohydrate. Caustic soda solutions, as initially obtained in commercial processes, are relatively dilute, ranging from 8 to 12 per cent in concentration and are extremely impure. These solutions must be concentrated and purified in order to produce a satisfactory commercial product and since many of the impurities present have a minimum solubility at a concentration of approximately 50 percent, the usual practice is to concentrate the solution to this concentration and remove those impurities which have crystallized or precipitated out of solution.

The solution resulting from this treatment is not sufficiently pure for many purposes since such impurities as iron, sodium chloride, sodium chlorate, sodium sulfate, etc., are present in relatively high concentrations. This is especially true of electrolytic caustic which contains so much sodium chloride that it is not suitable for use in certain processes. In order to obtain a purified product, a solid hydrate is sometimes crystallized out of solution, removed from the mother liquor and redissolved. The crystallization of the 3½ hydrate may be obtained by diluting a filtered 50 percent liquor to 39 percent, chilling to approximately 10° C. and removing the precipitated crystals. These crystals may then be melted and the solution reconcentrated to 50 percent. Purification by the crystallization of the dihydrate may be secured by chilling a filtered 50 percent liquor to approximately 12° C., removing the precipitated crystals and redissolving them.

In some cases purification by precipitation of the monohydrate has been resorted to. This has been effected by concentration to 65–70 percent and cooling to the point at which monohydrate crystals precipitate. The crystals formed in this process are large paper-like flakes which are extremely difficult to handle. While some purification is obtained, these crystals contain substantial quantities of impurities which can not be satisfactorily removed.

In accordance with our invention, we are able to secure purified caustic soda solution without recourse to such extensive refrigeration or concentration as has heretofore been regarded as necessary to precipitate purified hydrates from aqueous solutions. At the same time, we are able to remove certain impurities which crystallize out of solution with the hydrate.

We have discovered that needle-like crytsals of monohydrate may be obtained from a caustic soda solution of about 55 to 60 percent concentration. These crystals being relatively small are very pure since they do not retain such large quantities of crystallized impurities or impure mother liquor as are retained when crystals are precipitated from 65 to 70 percent liquor.

If the impurities present in the liquor are in concentrations below their saturation point at the temperature to which the liquor is cooled, no substantial quantity of impurities will be precipitated with the monohydrate crystals. Under such conditions, a highly purified solution of caustic may be obtained by dissolving the crystals after separation from the mother liquor.

If the impurities present in the liquor are in large concentrations, a substantial quantity thereof may precipitate with the monohydrate and it may be necessary to remove them from the crystallized monohydrate. For example, when caustic soda liquors which contain large quantities of sodium chloride are cooled, a substantial quantity of sodium chloride crystals are formed. While the monohydrate crystals obtained from a 55 to 60 percent solution are much finer than the large paper-like flakes obtained from 65 to 70 percent solutions, it has been found that they are relatively coarse with respect to the very fine crystals of sodium chloride which precipitate with them. Thus, a separation may be secured, for example, by recourse to filtration thru a filter having the proper pore size. In such a process, a large portion of the fine sodium chloride crystals passes through the filter with the filtrate, while very pure monohydrate crystals deposit upon the filter surface. The process is not limited to separation by filtration as the crystals may be separated by any convenient method, as by centrifuging, classification, etc.

If a colored caustic liquor is so treated, the crystals produced can be dissolved and diluted to yield a fifty percent liquor which is almost water white. It has been observed, by comparative analysis, that the concentration of such impurities as iron, chlorates, chlorides, silicon and aluminum compounds, and sulfates are noticeably reduced. Other impurities which have not, as yet, been identified may also be removed. At all events, the resultant liquor is remarkably clear.

The following examples illustrate the process:

*Example I.*—Filtered 50 percent electrolytic caustic was evaporated to 57 percent, and was found to have the following analysis:

|  | NaOH | NaCl | NaClO$_3$ | Fe |
|---|---|---|---|---|
|  | Percent | Percent | Percent | Percent |
| Actual analyses | 57 | 1.13 | 0.38 | 0.00059 |
| Analysis on anhydrous basis | 96.53 | 1.91 | 0.64 | 0.00100 |

The liquor was slowly cooled to a temperature of 28° C. and the resultant liquor filtered thru a nickel screen of 32 mesh. The crystals, after washing with 50 percent purified caustic liquor, had the following composition:

|  | NaOH | NaCl | NaClO$_3$ | Fe |
|---|---|---|---|---|
|  | Percent | Percent | Percent | Percent |
| Actual analysis | 64.7 | 0.48 | 0.04 | 0.00021 |
| Analysis on anhydrous basis | 97.6 | 0.72 | 0.06 | 0.00032 |

*Example II.*—A portion lime soda liquor having the analysis:

|  | NaOH | NaCl | Fe |
|---|---|---|---|
|  | Percent | Percent | Percent |
| Actual analysis | 58.5 | 0.36 | 0.0020 |
| Analysis on anhydrous basis | 98.9 | .61 | 0.0034 | was cooled in the same manner and the composition of crystals obtained was as follows:

|  | NaOH | NaCl | Fe |
|---|---|---|---|
|  | Percent | Percent | Percent |
| Actual analysis | 66.8 | 0.12 | 0.0004 |
| Analysis on anhydrous basis | 99.2 | 0.18 | 0.0006 |

Exceptionally pure caustic solutions can be obtained by concentrating a filtered 50 percent caustic liquor to 55-60 percent and crystallizing the monohydrate in accordance with this invention. This purification process is not limited to treatment of such liquors, however, and in some cases, it may be desirable to purify solutions of other concentrations. At all events, regardless of the original concentration, it is preferred that the liquor be brought to a concentration of approximately 55-60 percent before a substantial quantity of the monohydrate is permitted to solidify since substantial departures from this concentration may result in the formation of large paper-like crystals and a more impure product.

The rate and extent of cooling will depend upon the yield desired, purity and concentration of the initial solution, etc. Cooling at 20-30° C. is usually sufficient for most purposes, but in some cases cooling to 10° C. or below may be advisable. From an economic standpoint, it is often desirable to avoid the expense of cooling below atmospheric temperature, and I find that satisfactory results may be obtained by cooling to room temperature. Usually, it is preferred to control the rate of cooling to the extent that fine individual crystals separate out of solution and the formation of crystal agglomerates is avoided. This may be carried out by stirring the solution while cooling slowly in the presence of seed crystals.

The process does not require a filter of special construction, and conventional devices may be used. Plant operation has been carried out using the ordinary nickel screen filter cloths. The selection of the proper mesh screen will depend upon the relative size of the sodium chloride and the monohydrate crystals and since this will depending largely upon the rate of cooling, concentration and purity of initial solution, etc., the selection of the proper filter size must be governed accordingly. Whether fractional filtration to remove sodium chloride is necessary or not, will be determined by the quantity of sodium chloride which precipitates with the monohydrate.

After filtration, the crystalline residue may be washed in order to remove occluded liquor. Various methods of washing are available, but it is usually desirable to wash with some liquor which will not dissolve substantially quantities of the crystals. Caustic liquor of high purity and having approximately the same concentration as the crystals being washed, may be used for this purpose. 50 percent liquor may be used in some cases for this purpose.

The crystals obtained may be dissolved and diluted to form a commercial 50 percent liquor, or if desired, they may be further concentrated to form 70 percent, or anhydrous caustic.

While the separation of crystallized impurities from hydrated sodium hydroxide has been discussed with refernece to the precipitation of the monodrate, the invention is not so limited as the process may be applied to the separation of these impurities from certain other hydrates. For example, a 39 percent solution of sodium hydroxide when saturated with sodium chloride may be slowly cooled to simultaneously crystallize impurities and the 3½ hydrate. The fine crystals of sodium chloride, sodium sulphate, etc., may then be separated from the coarser hydrate crystals in a suitable manner, for example, by filtration.

Although the present invention has been described in connection with the specific details of certain embodiments thereof, it is not intended that such details shall be regarded as limitations upon the scope of the invention except insofar as included in the accompanying claims.

We claim:

1. The process of purifying sodium hydroxide which comprises concentrating an impure aqueous solution of sodium hydroxide substantially saturated with sodium chloride to a concentration such that the monohydrate will crystallize therefrom, cooling to crystallize a substantial quantity of both relatively coarse hydrated sodium hydroxide and relatively fine sodium chloride crystals, and effecting a substantial separation of the relatively coarse sodium hydroxide crystals from the relatively fine sodium chloride crystals by passing the resultant liquor through a filter of such porosity that substantial quantities of sodium chloride crystals pass therethrough while substantial quantities of sodium hydroxide crystals do not.

2. The process of purifying an impure aqueous solution of sodium hydroxide substantially saturated with sodium chloride which comprises concentrating the said solution to a concentration of 55 to 60 percent, bringing the said solution to a temperature at which a substantial amount of relatively coarse monohydrate crystals and relatively fine crystals of sodium chloride are precipitated and effecting a substantial separation of the two by passing the resultant liquor through a filter of such porosity that substantial quantities of sodium chloride crystals pass therethrough while substantial quantities of sodium hydroxide crystals do not.

3. The process of purifying an impure aqueous solution of sodium hydroxide substantially saturated with sodium chloride, which comprises concentrating said solution to a sodium hydroxide concentration of 55 to 60 percent and cooling to about 20 to 30° C., permitting crystallization of the substances dissolved therein, whereby substantial amounts of relatively coarse crystals of hydrated sodium hydroxide and relatively fine crystals of sodium chloride are formed, and effecting a substantial separation of the two by passing the resultant liquor through a filter of such porosity that substantial quantities of sodium chloride crystals pass therethrough while substantial quantities of sodium hydroxide crystals do not.

4. The process of purifying an impure aqueous solution of sodium hydroxide of a concentration such that upon cooling, the monohydrate of said hydroxide will crystallize; said solution being substantially saturated with sodium chloride which comprises cooling to precipitate a mixture containing substantial amounts of relatively coarse sodium hydroxide monohydrate crystals and relatively fine sodium chloride crystals and effecting a substantial separation of the two by passing the resultant liquor through a filter of such porosity that substantial quantities of sodium chloride crystals pass therethrough while substantial quantities of sodium hydroxide crystals do not.

5. The process of purifying an impure solution of sodium hydroxide of substantially 55 to 60 percent concentration and being substantially saturated with sodium chloride which comprises cooling said solution whereby substantial amounts of relatively coarse crystals of hydrated sodium hydroxide and relatively fine crystals of sodium chloride are precipitated and effecting a substantial separation of the two by passing the resultant liquor thru a filter of such porosity that substantial quantities of sodium chloride crystals pass therethru, while substantial quantities of sodium hydroxide crystals do not.

6. The process of purifying an impure aqueous solution of sodium hydroxide of a concentration such that upon cooling, the monohydrate of said hydroxide will crystallize; said solution being substantially saturated with sodium chloride which comprises cooling to precipitate a mixture containing substantial amounts of relatively coarse hydrated sodium hydroxide crystals and relatively fine sodium chloride crystals and effecting a substantial separation of the two by filtration through a foraminous body having interstices of a size sufficient to permit passage of a substantial portion of the fine crystals of sodium chloride while retaining the larger monohydrate crystals and washing the filtered residue with a solution which will not dissolve substantial quantities of said hydroxide crystals.

7. The process of preparing purified sodium hydroxide from an aqueous solution of sodium hydroxide of a concentration such that the monohydrate may be precipitated therefrom, said solution being substantially saturated with a sodium salt which comprises bringing the solution to a temperature at which a substantial amount of relatively coarse monohydrate crystals and relatively fine crystals of said salt are precipitated and separating the relatively fine crystals from the relatively coarse crystals by filtration through a foraminous body having interstices of a size sufficient to permit passage of a substantial portion of the fine crystals of said salts while retaining a substantial portion of the larger monohydrate crystals.

8. The process of preparing purified sodium hydroxide from an aqueous solution of sodium hydroxide of a concentration such that the monohydrate may be precipitated therefrom, said solution being substantially saturated with a sodium salt which comprises bringing the solution to a temperature at which a substantial amount of relatively coarse monohydrate crystals and relatively fine crystals of said impurity are precipitated and separating the relatively fine crystals from the relatively coarse crystals by filtration through a foraminous body having interstices of a size sufficient to permit passage of a substantial portion of the fine crystals of said salts while retaining a substantial portion of the larger monohydrate crystals and washing said monohydrate crystals with sodium hydroxide solution of substantially 50 per cent concentration.

9. The process of preparing purified sodium hydroxide from an aqueous solution of sodium hydroxide which is substantially saturated with a sodium salt which comprises concentrating said solution until the sodium hydroxide content thereof is approximately 50 per cent, removing precipitated impurities, further concentrating until the sodium hydroxide content is such that the monohydrate may be precipitated therefrom, bringing said solution to a temperature at which a substantial amount of relatively coarse monohydrate crystals and relatively fine crystals of said salt are precipitated and separating the relatively fine crystals from the relatively coarse crystals by filtration through a foraminous body having interstices of a size sufficient to permit passage of a substantial portion of the fine crystals of said salts while retaining a substantial portion of the larger monohydrate crystals.

IRVING E. MUSKAT.
WILLIAM F. WALDECK.